(12) United States Patent
Ramakumar et al.

(10) Patent No.: US 9,471,941 B2
(45) Date of Patent: *Oct. 18, 2016

(54) MANAGING DELIVERY OF APPLICATION SERVER CONTENT

(71) Applicant: eBay Inc., San Jose, CA (US)

(72) Inventors: Sanjeev Ramakumar, San Jose, CA (US); Philip Law, San Jose, CA (US); Venu Reddy, San Jose, CA (US); Dmytro Semenov, San Jose, CA (US); Bin Ni, Fremont, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/263,528

(22) Filed: Apr. 28, 2014

(65) Prior Publication Data

US 2014/0236783 A1 Aug. 21, 2014

Related U.S. Application Data

(63) Continuation of application No. 13/045,372, filed on Mar. 10, 2011, now Pat. No. 8,713,103.

(51) Int. Cl.
*G06Q 40/00* (2012.01)
*G06Q 10/10* (2012.01)
*G06F 11/34* (2006.01)

(52) U.S. Cl.
CPC .......... *G06Q 40/12* (2013.12); *G06Q 10/101* (2013.01); *G06F 11/3438* (2013.01)

(58) Field of Classification Search
CPC . G06F 11/3438; G06Q 40/12; G06Q 10/101
USPC ........ 709/204–205, 224; 715/234, 655, 269; 705/14.49
See application file for complete search history.

(56) References Cited

U.S. PATENT DOCUMENTS

| 7,159,206 | B1 | 1/2007 | Sadhu et al. |
| 7,593,928 | B2 * | 9/2009 | Canon et al. |
| 7,653,688 | B2 * | 1/2010 | Bittner .......................... 709/204 |
| 7,680,858 | B2 * | 3/2010 | Poola et al. .................. 707/736 |
| 7,966,564 | B2 * | 6/2011 | Catlin et al. .................. 715/745 |

(Continued)

OTHER PUBLICATIONS

"U.S. Appl. No. 13/045,372, Final Office Action mailed Sep. 9, 2013", 9 pgs.

(Continued)

*Primary Examiner* — Abdullahi E Salad
(74) *Attorney, Agent, or Firm* — Schwegman, Lundberg & Woessner, P.A.

(57) ABSTRACT

A method of managing delivery of content to end users of an application executing on an application server is disclosed. A definition of a first variant of a web page is received, the definition of the first variant specifying that an instance of a first widget is to be included in the first variant at a first region conforming to a page layout of the web page. A definition of a second variant of the web page is received, the definition of the second variant specifying that an instance of a second widget is to be included in the second variant at a second region conforming to the page layout of the web page. A comparison of the first variant and the second variant is presented with respect to a performance metric, the performance metric pertaining to an effectiveness of the web page at bringing in revenues to a network-based publication system.

20 Claims, 18 Drawing Sheets

(56) References Cited

U.S. PATENT DOCUMENTS

| | | | |
|---|---|---|---|
| 8,332,408 B1* | 12/2012 | Rudary | 707/737 |
| 8,444,420 B2 | 5/2013 | Scott | |
| 8,713,103 B2 | 4/2014 | Ramakumar et al. | |
| 2002/0156668 A1* | 10/2002 | Morrow et al. | 705/8 |
| 2003/0144898 A1 | 7/2003 | Bibelnieks et al. | |
| 2007/0055663 A1 | 3/2007 | Hancheroff et al. | |
| 2008/0015880 A1* | 1/2008 | Freedenberg et al. | 705/1 |
| 2008/0027861 A1* | 1/2008 | Gendler | 705/40 |
| 2009/0182770 A1* | 7/2009 | Madhavan | 707/103 R |
| 2009/0192783 A1 | 7/2009 | Jurach, Jr. et al. | |
| 2009/0282343 A1* | 11/2009 | Catlin et al. | 715/738 |
| 2010/0095197 A1* | 4/2010 | Klevenz et al. | 715/234 |
| 2010/0121718 A1* | 5/2010 | AlanDietz | 705/14.58 |
| 2010/0145762 A1 | 6/2010 | Coladonato et al. | |
| 2010/0174603 A1 | 7/2010 | Hughes et al. | |
| 2010/0262471 A1 | 10/2010 | Hughes | |
| 2012/0079374 A1 | 3/2012 | Gaddis | |
| 2012/0102114 A1 | 4/2012 | Dunn et al. | |
| 2012/0159307 A1* | 6/2012 | Chung et al. | 715/234 |
| 2012/0233312 A1 | 9/2012 | Ramakumar et al. | |
| 2012/0254043 A1 | 10/2012 | Hughes | |

OTHER PUBLICATIONS

"U.S. Appl. No. 13/045,372, Non Final Office Action mailed Apr. 10, 2013", 7 pgs.

"U.S. Appl. No. 13/045,372, Non Final Office Action mailed Sep. 7, 2012", 5 pgs.

"U.S. Appl. No. 13/045,372, Notice of Allowance mailed Dec. 18, 2013", 9 pgs.

"U.S. Appl. No. 13/045,372, Response filed Jan. 7, 2013 to Non Final Office Action mailed Sep. 7, 2012", 9 pgs.

"U.S. Appl. No. 13/045,372, Response filed Aug. 12, 2013 to Non Final Office Action mailed Apr. 10, 2013", 10 pgs.

"U.S. Appl. No. 13/045,372, Response filed Nov. 20, 2013 to Final Office Action mailed Sep. 9, 2013", 14 pgs.

* cited by examiner

MANAGING DELIVERY OF APPLICATION SERVER CONTENT

CROSS-REFERENCE TO RELATED APPLICATIONS

This application is a continuation of prior U.S. patent application Ser. No. 13/045,372, filed on Mar. 10, 2011, which is incorporated by reference herein in its entirety.

TECHNICAL FIELD

The present application relates generally to the technical field of managing delivery of content provided by applications executing on an application server, and, in one specific example, to centralizing the creation, modification, approval of, publication, and testing of web pages served by web applications.

BACKGROUND

Content provided by applications executing on an application server may be created, modified, published, and tested in a variety of ways. For example, each of multiple authors responsible for creating content provided by a store application executing on an application server of a network-based publication system (e.g., EBAY®, AMAZON®, or CRAIGSLIST®) may use different tools to perform any of the steps of creating, modifying, approving, publishing, and testing the content. Furthermore, with any specific content development effort, the tools used by one author may not be the same as the tools used by another author. This ad hoc approach to developing and managing delivery of content served by the application may result in the store application having a disjointed or otherwise uneven look and feel to an end user of the application. Furthermore, this ad hoc approach may make it difficult for an owner of the application to approve of and test content before making it widely available to the end users of the application.

BRIEF DESCRIPTION OF THE DRAWINGS

Some embodiments are illustrated by way of example and not limitation in the figures of the accompanying drawings in which.

DETAILED DESCRIPTION

Figure 1:
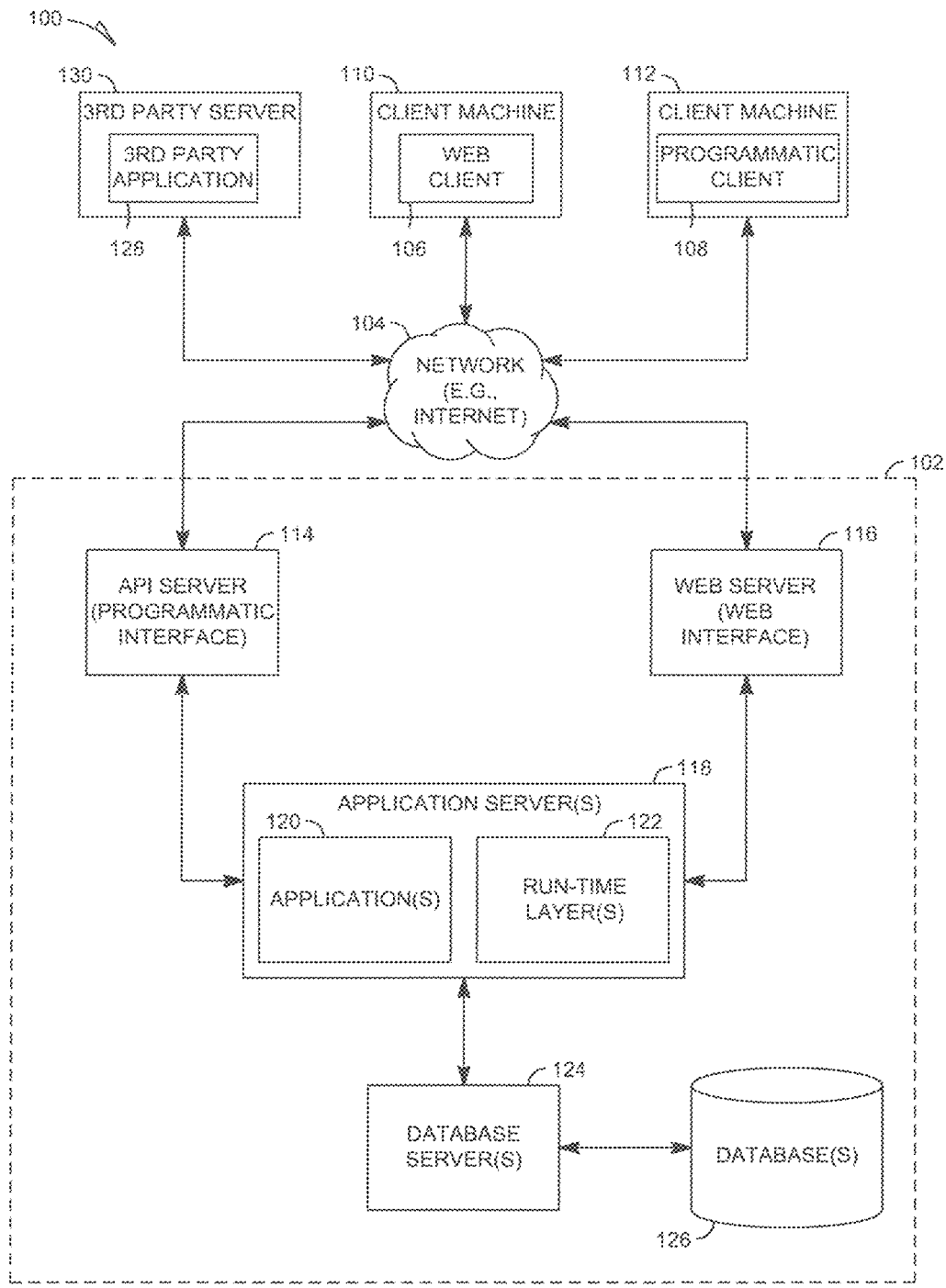
FIG. 1 is a network diagram depicting a client-server system within which various example embodiments may be deployed.

In the following description, for purposes of explanation, numerous specific details are set forth in order to provide an understanding of various embodiments of the present subject matter. It will be evident, however, to those skilled in the art that various embodiments may be practiced without these specific details.

Consistent with various embodiments, a method of managing delivery of content to end users of an application executing on an application server is disclosed. A definition of a first variant of a web page to be presented by the application is received, the definition of the first variant specifying that an instance of a first widget is to be included in the first variant at a first region, the first region conforming to a page layout of the web page. A definition of a second variant of the web page is received, the definition of the second variant specifying that an instance of a second widget is to be included in the second variant at a second region, the second region conforming to the page layout of the web page. A comparison of the first variant and the second variant is presented with respect to a performance metric, the performance metric pertaining to an effectiveness of the web page at bringing in revenues to a network-based publication system (or an entity associated with the network-based publication system).

This method and the various embodiments disclosed herein may be implemented as a computer system having one or more modules (e.g., hardware modules or software modules). This method and the various embodiments disclosed herein may be embodied as instructions stored on a machine-readable medium that, when executed by a processor, cause the processor to perform the method.

Various embodiments may be implemented as modules of a content-optimization application associated with a network-based publication system. The content-optimization application may receive input (e.g., via user interfaces) from various users of the content-optimization application, including content developers, team members, administrators, or other users. For example, the content-optimization application may receive parameters associated with the projects and the format of the content (e.g., definitions of page layouts) from the administrators. Such input may include definitions of project types (described in more detail below) that may be associated with a particular project (described in more detail below), countries for which content associated with a project may be targeted, or types (or roles) of team members who are responsible for approving content developed for a project.

The content-optimization application may receive definitions of content or portions of content from the content developers. Such definitions may correspond to multiple variants of portions of content. The content developers may be constrained by the parameters (e.g., available widgets, page layouts, project types, and so on) defined by the administrators. These constraints may cause the content developed for a particular application or web site to have a consistent look or feel to end users of the application or web site.

The content-optimization applications may receive approvals of or rejections of portions of content from the team members, and publish the variants to end-users of the network-based publication system based on the approvals or rejections. Thus, by requiring particular types of team members to review content associated with a project, administrators may ensure that published content is controlled for quality.

The content-optimization application may also provide output to the users of the content-optimization application that includes statistics pertaining to the effectiveness of particular variants at bringing in revenues to the network-based publication. For example, the content-optimization application may rank variants according to the likelihood that an end-user of an application corresponding to the variant will engage in a transaction for which an entity associated with the network-based publication system receives a transaction fee.

Thus, the content-optimization application may enable an entity associated with a network-based publication system to manage the steps of creating, modifying, approving, publishing, and testing content served by applications executing on an application server associated with the network-based publication system.

FIG. 1 is a network diagram depicting a client-server system 100, within which various example embodiments may be deployed. A networked system 102, in the example forms of a network-based marketplace or other publication system, provides server-side functionality, via a network 104 (e.g., the Internet or Wide Area Network (WAN)) to one or more clients. FIG. 1 illustrates, for example, a web client 106 (e.g., a browser, such as the Internet Explorer browser developed by Microsoft Corporation of Redmond, Wash.) and a programmatic client 108 executing on respective client machines 110 and 112. Each of the one or more clients may include a software application module (e.g., a plug-in, add-in, or macro) that adds a specific service or feature to a larger system. The software application module may be separate from but tightly-integrated into a user interface and functionality of a software application, such as a spreadsheet application. The software application may be a client software application executing on a client machine. The software application module may be optionally deployed in the same environment as the software application such that the software application module can be accessed from within the software application. The software application module may be optionally enabled or disabled within the environment (e.g., user interface) of the software application. The software application module may appear to be a part of the software application by, for example, providing user interface components or widgets (e.g., menus, toolbars, menu commands, toolbar commands, and so on) that can be enabled, disabled, added to, or removed from standard user interface components or widgets provided by the software application.

An API server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more databases servers 124 that facilitate access to one or more databases or NoSQL or non-relational data stores 126.

The marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later redeem the accumulated value for products (e.g., goods or services) that are made available via the marketplace applications 120. While the marketplace and payment applications 120 and 122 are shown in FIG. 1 to both form part of the networked system 102, in alternative embodiments, the payment applications 122 may form part of a payment service that is separate and distinct from the networked system 102.

Further, while the system 100 shown in FIG. 1 employs a client-server architecture, various embodiments are, of course, not limited to such an architecture, and could equally well find application in a distributed, or peer-to-peer, architecture system, for example. The various marketplace and payment applications 120 and 122 could also be implemented as standalone software programs, which do not necessarily have networking capabilities. Additionally, although FIG. 1 depicts machines 130, 110, and 112 as being coupled to a single networked system 102, it will be readily apparent to one skilled in the art that machines 130, 110, and 112, as well as applications 128, 106, and 108, may be coupled to multiple networked systems. For example, the application 128, 106, and 108 may be coupled to multiple payment applications 122, such as payment applications 122 associated with multiple payment processors (e.g., Visa, MasterCard, and American Express).

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace or payment functions that are supported by the relevant applications of the networked system 102.

Figure 2:
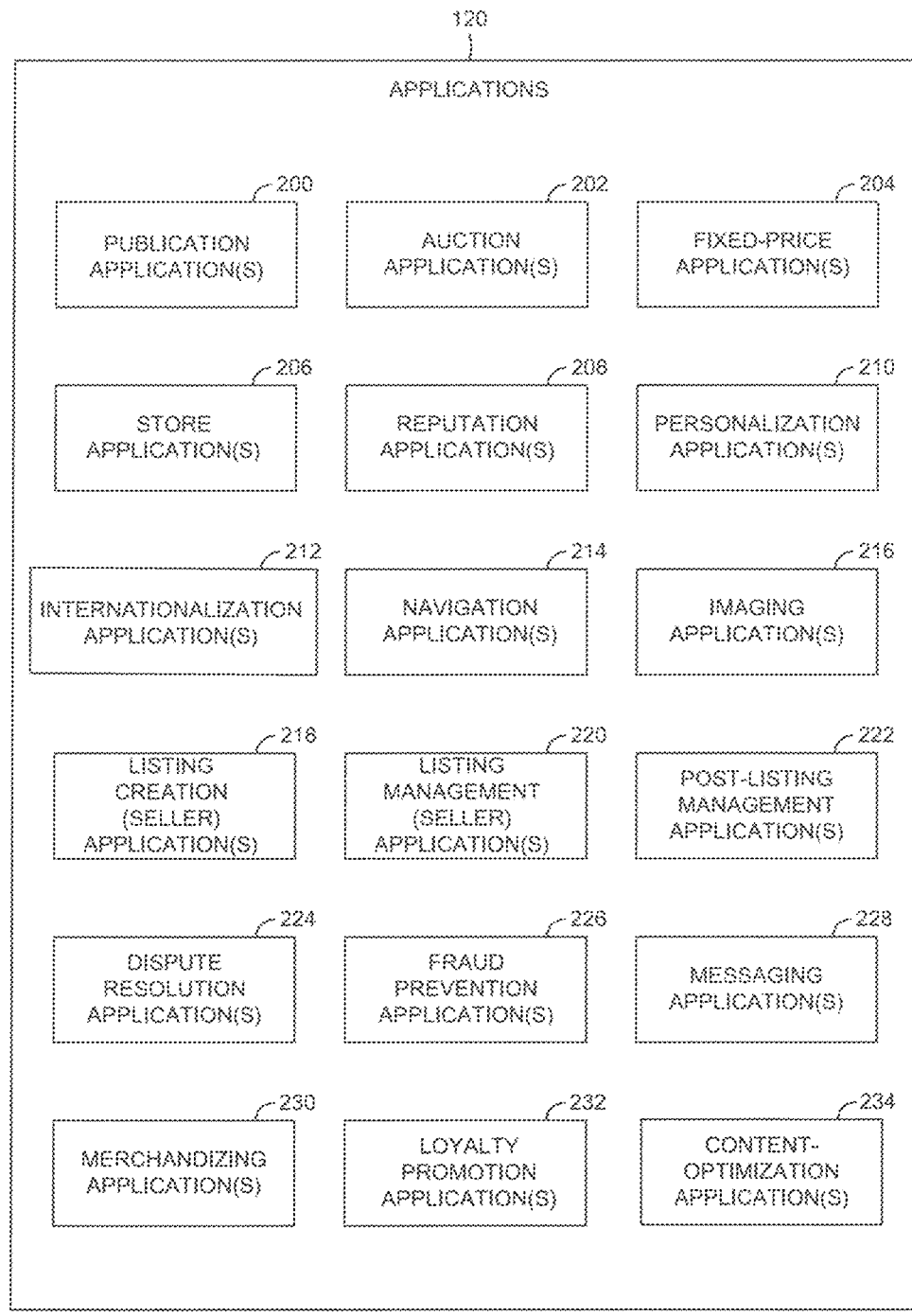
FIG. 2 is a block diagram illustrating multiple applications including content-optimization applications that, in various example embodiments, are provided as part of the networked system of FIG. 1.

FIG. 2 is a block diagram illustrating multiple applications 120 and 122 that, in various example embodiments, are provided as part of the networked system 102. The applications 120 and 122 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 126 via the database servers 124.

The networked system 102 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 120 are shown to include at least one publication application 200 and one or more auction applications 202 which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives and features that are specific and personalized to a relevant seller.

Reputation applications 208 allow users that transact, utilizing the networked system 102, to establish, build and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (for example through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace, or may be customized (or internationalized) presentations of a common underlying marketplace. The networked system 102 may accordingly include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application) may enable key word searches of listings published via the networked system 102. A browse application may allow users to browse various category, catalogue, or inventory data structures according to which listings may be classified within the networked system 102. Various other navigation applications may be provided to supplement the search and browsing applications.

In order to make listings, available via the networked system 102, as visually informing and attractive as possible, the marketplace applications 120 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. The listing creation application 218 and listing management applications 200 may allow sellers to manage listing in bulk (e.g., in a single operation, such as by an uploading of a file) and provide templates for sellers to manage category-specific, vendor-specific, or general-type-specific (e.g., catalog or ticket) listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller to conveniently provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of operations in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102. These messages may, for example, advise users regarding the status of listings at the networked system 102 (e.g., providing "outbid" notices to bidders during an auction process or providing promotional and merchandising information to users). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotion applications 232. For example, a buyer may earn loyalty or promotions points for each transaction established and/or concluded with a particular seller, and may be offered a reward for which accumulated loyalty points can be redeemed.

Content-optimization applications 234, described in more detail below, enable users to manage content that is associated with or provided by any of the other applications 200-232. For example, the content-optimization applications 234 enable a content developer associated with a network-based marketplace system to develop content for a store application. The content-optimization applications 234 may centralize the steps of creating, modifying, approving, publishing, and testing content to be provided to end users of the applications.

Figure 3:
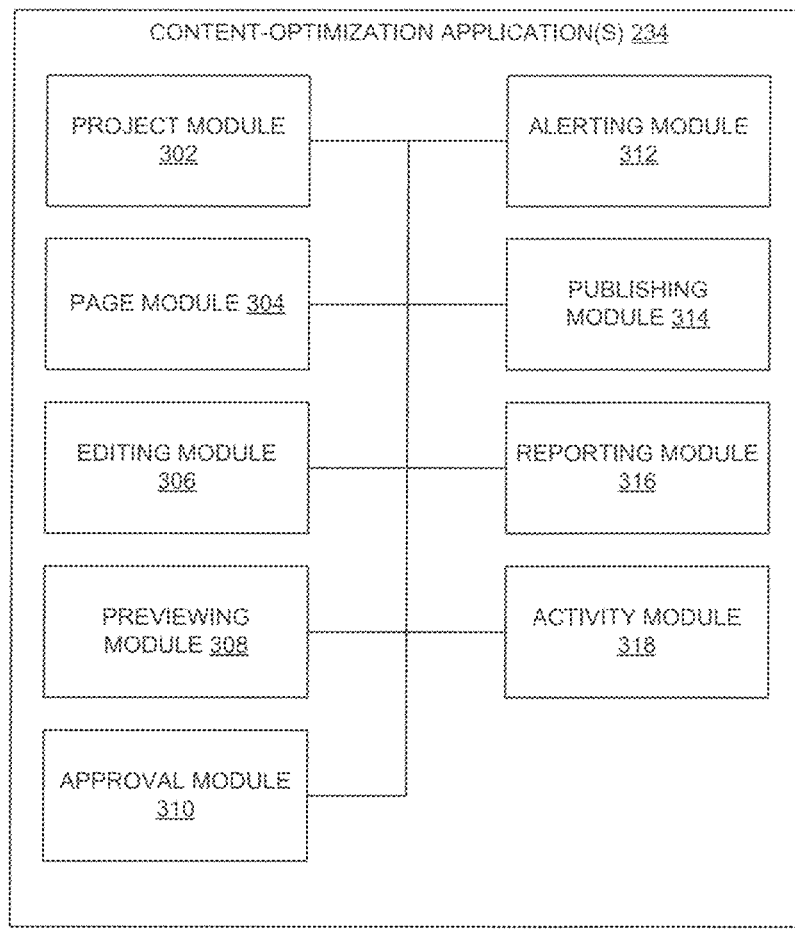
FIG. 3 is a block diagram illustrating example modules of the content-optimization applications of FIG. 2.

FIG. 3 is a block diagram illustrating example modules of the content-optimization applications 234. The content-optimization applications 234 include a project module 302 that is configured to create, modify, and remove projects. As defined herein, a "project" is data associated with a grouping of portions of content (e.g., web pages) served by an application executing on an application server. For example, such data may specify a project type associated with the grouping (e.g., definitions of page layouts that may be associated with portions of the grouping or specifications of widgets that may be included on the portions), a selected set of countries to which the grouping pertains, or a team having members responsible for managing the life cycles of the grouping. The data may be referred to as a project configuration.

The content-optimization applications 234 include a page module 304 that is configured to create, modify, and remove a portion (e.g., a web page) of the content of a project. The content-optimization applications 234 include an editing module 306 that is configured to create, modify, and remove variants of a portion of a web page. The editing module 306 may also be configured to associate an instance of one or more widgets of a particular set of widgets with one or more respective regions of a variant of a web page (e.g., based on a dragging and dropping of a visual representation of the widget onto a visual representation of the web page).

The content-optimization applications 234 include previewing module 308 that is configured to display a preview of one or more variants of a web page. The preview may depict a variant as it would appear to an end user of the application upon a publication of the variant.

The content-optimization applications 234 include a publishing module 310 that is configured to publish the portion (e.g., a web page) of the content. The publishing module 310 may be configured to base the publishing on the receiving of a request from an author of a portion of the content to publish the content. The publishing module 310 may also be configured to publish the content based on a receiving of an approval from one or more members of a team associated with the project to which the content belongs. The publishing module 310 may publish the portion by storing it as a configuration in a database (e.g., the database 126).

The content-optimization applications 234 include an alerting module 312 that is configured to alert the one or more members of a team associated with a project that an author of a portion (e.g., a web page) of the content has requested publication of the portion. The notification of the request may be based on the one or more team members being designated as required approvers of the content. The alerting module 312 may also be configured to alert the author of the approval or rejection of the request by the one or more team members. The notification of the approval or rejection may include an explanation from the one or more team members of the reasons for the approval or rejection. The alerting module 312 may also be configured to update a status of the web page based on a submission of the request for publication or the receiving of an approval or a rejection of the request.

The content-optimization applications 234 include an approval module 314 that is configured to receive from the one or more members of the team an approval or rejection of a request by an author to publish content. The approval module 314 may also prompt the one or more team members to provide reasons for the approval or rejection.

The content-optimization applications 234 include a reporting module 316 that reports various metrics of one or more variants of the portion of the content. The metrics may pertain to the effectiveness of each of the respective variants at bringing in revenues to the network-based publication system. For example, one of the metrics may be a view item page (VIP) ratio. The VIP ratio may represent a probability that a user who accesses the content will perform an action that leads to an increase in revenues for an entity associated with the network-based publication system. For example, the VIP ratio may specify the ratio of accesses of the portion of the content to an amount of fees collected by via the network-based publication system as a result of actions of the user to purchase or bid on an item that is featured in the portion of the content.

The content-optimization applications 234 include an activity module 318 that tracks and presents information pertaining to the activities of the one or more team members with respect to the project. For example, the activity module 318 may track information relating to the dates and times authors modify portions of variants of a particular web page or request approval for the publication of a variant. Additionally, the activity module 318 may track information relating to the dates and times team members approve or reject a request to publish a variant.

Figure 4:
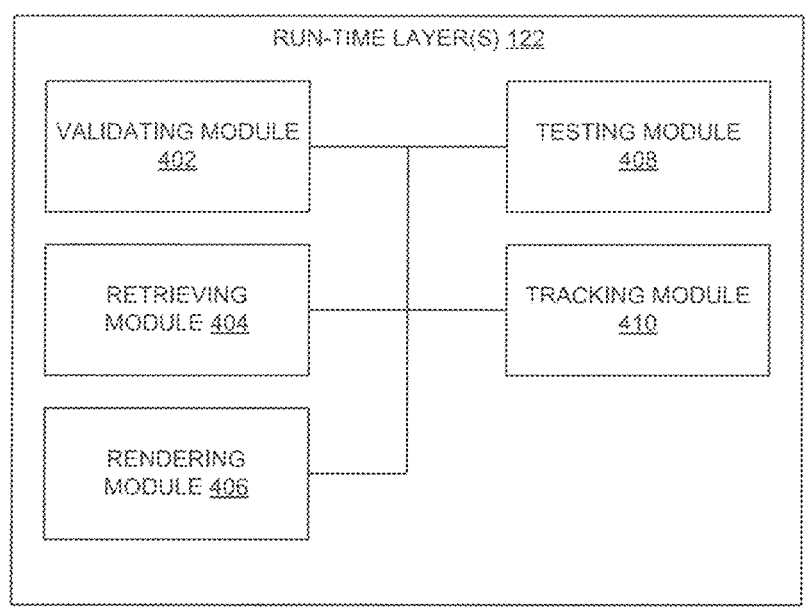
FIG. 4 is a block diagram illustrating example modules of the run-time layer(s) shown in FIG. 1.

FIG. 4 is a block diagram illustrating example modules of the run-time layer(s) 122. The run-time layers 122 include a validating module 402 that is configured to validate an address (e.g., a URL) by which an end user is attempting to access a portion (e.g., a web page) of the content served by an application executing on an application server. The run-time layers 122 include a retrieving module 404 that is configured to retrieve a configuration associated with a latest published version of the portion of the content that is to be served to the user based on the address. The configuration may be retrieved from a database (e.g., database 126). The configuration may be a configuration stored in the database by the publishing module 310.

The run-time layers 122 include a rendering module 406 that is configured to render the portion of the content based on the retrieved configuration. The rendering module 406 may interpret the configuration based on a detection of a device type, device characteristic, or particular device on which the content is to be rendered.

The run-time layers 122 include a testing module 408 that is configured to select a variant from one or more variants associated with the portion of the content for testing.

The run-time layers 122 include a tracking module 410 that is configured to track the activities of end users of the application with respect to the one or more variants of the web page. The tracking module 410 may also be configured to calculate one or more metrics pertaining to the one or more variants. Such metrics may include a VIP ratio.

Figure 5:
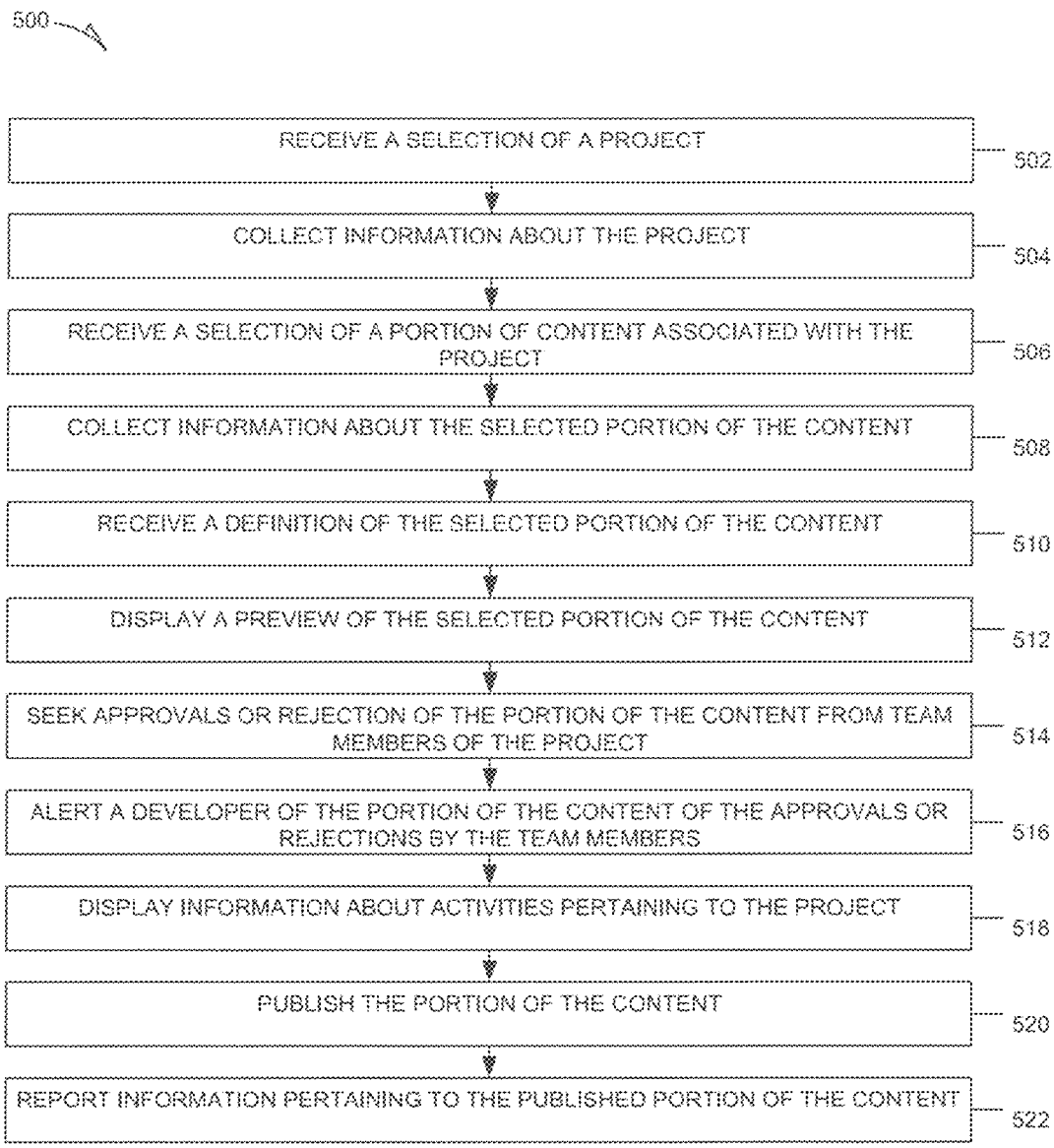
FIG. 5 is a flowchart illustrating an example method of managing the publication of application server content.

FIG. 5 is a flowchart illustrating an example method 500 of managing publication of application server content. Various operations of the method 500 are performed by the content-optimization applications 234. At operation 502, the project module 302 receives a selection of a project. The selection may be an existing project or a new project that is to be created by the project module 302. For example, the project module 302 may present a user interface (e.g., the projects dashboard 700 of FIG. 7). The user interface may include a listing of existing projects from which a user of the content-optimization application 234 (e.g., an author of a portion of the content to be served by a server application) may make a selection (e.g., by clicking on a link associated with a name of an existing project). The user interface may also include a mechanism (e.g., a button) by which a user of the dashboard may instruct the project module to create a new project that is to serve as the selection.

At operation 504, the projects module 302 retrieves information about the selected project. Some of the information may be retrieved from a database. For example, the project module 302 may retrieve some of the information from a project information database included in the database 126. The project information database may be maintained by an administrator of the content-optimization applications 234. The information that the project module 302 retrieves from the project management database may include definitions of one or more project types. A project type may include a title, a description, definitions of one or more page layouts associated with the project type, and a listing of widgets enabled for inclusion on portions of that content (e.g., web pages) associated with the project type.

The information that the project module 302 retrieves from the project management database may include names of countries (e.g., the United States, Germany, and France) that may be associated with the selected project.

The information that the project module 302 retrieves from the project management database may include information about one or more required members of a team associated with the project. A required member may be a member of the team whose approval is required for a user to publish portions of the content served by the server application. The information about the one or more required members may include a role of each required member. Examples of roles include owner, approver, quality assurance, accessibility, or Search Engine Optimization (SEO).

Figure 8:
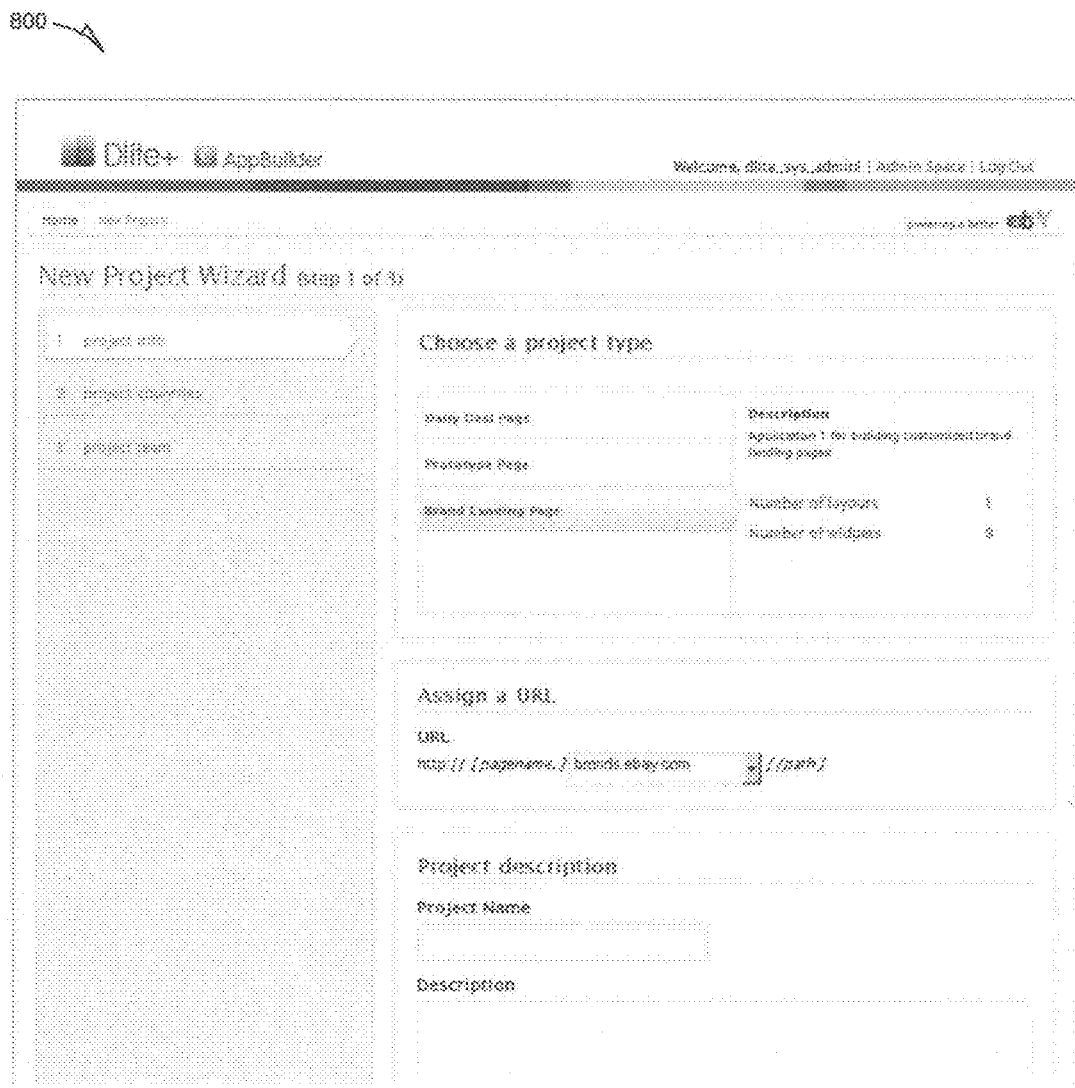
FIGS. 8 and 9 are screenshots of an example user interface for a new project wizard.

Additionally, the project module 302 may retrieve some of the project information from a user of the content-optimization application 324 via a user interface (e.g., the New Project Wizard 800 of FIG. 8). For example, the project module 302 may retrieve from the user a project type to associate with the selected project, an address (e.g., a URL) to assign to the selected project, or a description of the selected project (e.g., a name of the selected project or a description of the selected project). Or the project module 302 may retrieve from the user a selection of one or more countries to associate with the selected project.

Or the project module 302 may retrieve from the user information about a required team member. For example, the project module 302 may retrieve from the user a resource name to associate with each required member. An example of a resource name is a name of a user of the content-optimization application 324. Or the project module 302 may retrieve from the user information about one or more additional members of the team. The additional members may be members of the team whose approval is not required for the publication. The information about the one or more additional members may include a role and a resource name to associate with the additional member.

At operation 506, the page module 304 receives a selection of a portion (e.g., a web page) of content associated with the project. The selection may be an existing portion or a new portion that is to be created by the page module 302. For example, the page module 304 may present a user interface (e.g., Project View 1000 of FIG. 10). The user interface may allow the user make a selection of an existing page (e.g., by clicking on a link associated with a title of an existing web page). The user interface may also include a mechanism (e.g., a button) by which a user of the dashboard may instruct the page module 304 to create a new page that is to serve as the selection.

At operation 508, the page module 304 retrieves information about the selected portion of the content. For example, the page module 304 may present a user interface (e.g., the New Page Wizard 1100 of FIG. 11) that includes user interface elements through which a user may provide information about the selected portion of the content. The information about the selected portion may include a name, an HTML title, a meta description, an expiration date, and an address (e.g., a URL) stub.

The information may also include a selection of a page layout from a set of page layouts. For example, the page module 304 may present a user interface (e.g., a new page wizard 1200 of FIG. 12) that includes graphical representations of one or more definitions (or configurations) of page layouts for selection by a user. Definitions of page layouts associated with the project may be retrieved by the project module 302 at operation 504.

At operation 510, the editing module 306 retrieves a definition of the selected portion of the content (e.g., a web page). The definition may specify that an instance of a particular widget is to be included in a particular region of the selected portion. The region may be one of the regions defined by a page layout associated with the selected portion. In other words, the locations of the widgets included in the definition may conform to a page layout (e.g., that is defined in an associated project). For example, the definition may specify that an instance of a header widget is to be placed in a region near the top of the selected portion or that an instance of a footer widget is to be placed in a region near the bottom of the selected portion.

The editing module 306 may present a user interface to retrieve the definition (or configuration) of the selected portion. The user interface may include a graphical representation of each of the widgets that are enabled for inclusion on the selected portion (e.g., based on the project information retrieved at operation 404). The user interface may also include a graphical representation of a page layout associated with the selected portion. The user interface may base the definition on a detecting of a dragging and dropping by a user of visual representations of the widgets onto a visual representation of a page layout associated with the selected portion.

Each instance of a widget may be a self-contained user interface element or object that may be integrated into the selected portion. Examples of widgets include header widgets, brand breadcrumb widgets, page title widgets, survey widgets, static content widgets, "share this" widgets, view navigation grid widgets, brand deals widgets, and footer widgets.

Each instance of a widget may be configurable from within the user interface. For example, the user interface may include a pane for setting configuration options for an instance of a widget (e.g., a selected widget) included in the selected portion. Configurable options for a header widget may include the header type, the page number, and a category ID. The user interface may provide a listing of possible values for a configuration option or perform data validation of settings entered by a user for the configuration option. The editing module 306 may analyze widgets to discover their configurable options and expose the configurable options to a user for editing via a user interface. The widgets may be designed and developed by software engineers independently of the content-optimization applications 234.

The definition of the selected portion of the content may include definitions of multiple variants of the content. For example, the definition may specify that a first variant of a web page is to include an instance of a first widget at a first region of a page layout associated with the web page and that a second variant of the web page is to include an instance of a second widget at a second region of the page layout. In various embodiments, the first widget may be the same as the second widget.

At operation 512, the previewing module 308 displays a preview of the selected portion. The displaying of the preview may be in response to a selection of a preview command (e.g., a button of the user interface presented by the editing module 306) by a user of the content-optimization applications 234. If the portion of the content has multiple variants, the previewing module 308 may enable a user of the content-optimization applications 234 to toggle between previews of each of the variants. For example, the previewing module 234 may display a tab (e.g., tab "A") for a first variant of the portion) and an additional tab (e.g., tab "B") for a second variant of the portion. The user of the content-optimization applications 234 may then select tab "A" to view a preview of the first variant or tab "B" to view a preview of the second variant.

The previewing module 308 may display, in a region of the previewing screen, the portion of the content as it would appear to an end based on a particular combination of software and hardware. For example, if the portion is a web page, the previewing module 308 may display the portion as it would appear to the end user in a web browser (e.g., Safari) running on a mobile device (e.g., an iPhone), in a web browser (e.g., Internet Explorer) running on a personal computer, or in any combination of supported client software and hardware. The previewing module 308 may present a user interface that enables a user of the content-optimization applications 234 to select a combination of supported software and hardware for which the preview is to be rendered.

At operation 514, the approval module 310 seeks approvals of the portion of the content from team members of the project. For example, the approval module 310 may seek approvals from team members that are designated as required approvers. The approval module 310 may also seek approvals from team members that are designated as optional approvers. To seek the approvals from the team members, the approval module 310 may use the alerting module 310 to notify the team members (e.g., via email, instant messenger, or another form of communication) to submit their approvals or rejections of the portion of the content. The approval module 310 may present a user interface by which a user of the content optimization applications 234 (e.g., a developer of the portion of the content) may submit the content for the approvals by the team members. Thus, the approval module 310 may seek the approvals based on a submission of the content by the user. The approval module 310 may set a state associated with the portion of the content to indicate that the portion has been submitted to team members for their approval.

The approval module 310 may present a user interface to each team member by which team members may indicate their approval or rejection of the portion of the content. The approval module 310 may also present a user interface to collect reasons from team members for their approval or rejection.

At operation 516, the alerting module 312 alerts the user (e.g., the developer of the portion of the content) of approvals or rejections by the team members, as well as reasons for the approvals or rejections. If a particular number of team members (e.g., all team members) who are required to approve of the portion of the content have each given their approvals, the alerting module may change the state associated with the portion of the content to indicate that the portion is ready for publication (e.g., to a live web site).

At operation 518, the activity module 318 displays information pertaining to activities of users of the content-optimization applications 234. Such information may be listed as activity items in order of recentness. For example, the information may include a list of activity items in which the top-most activity item is the activity performed most recently by a user of the content-optimization applications 234. The activity item may specify an action that was performed (e.g., that a page was created or that a project was created), information about the target of the activity (e.g., the name of page or a project, or a link to a user interface for managing a corresponding page or a project), or the time at which the activity was performed (e.g., 11 minutes ago).

At operation 520, the publishing module 314 publishes the portion of the content (e.g., to a live web site). The publication may be based on approvals having been received from a particular number of team members. In addition, the publication may be based on a request by a developer of the portion of the content to publish the portion. For example, the publishing module 314 may present a user interface by which the developer may submit the portion for publication. The publishing module 314 may also associate an identifier with the portion. The identifier may be used by other modules (e.g., the reporting module 316) to keep track of statistics related to accessing of the portion of the content on a live web site by end users. The publishing module 314 may also associate an identifier with each variant of the portion or use the same identifier for all variants of the portion.

At operation 522, the reporting module 316 reports information pertaining to the published content. Such information may pertain to the relative successes of the various variants of the portion of the content at persuading an end user to complete a transaction pertaining to a subject of the portion of the content via a network-based publication system. For example, the reporting module 316 may report which variant has the highest view item page (VIP) ratio. Additionally, the reporting module 316 may display various statistics about the variants in a graph. For example, the reporting module 316 may display the VIP ratios for each of several variants of the portion over a time period (e.g., a month or a week). The reporting module 316 may allow a user of the content-optimization applications 234 to apply filters to the information. For example, the reporting module 316 may provide a mechanism (e.g., selectable checkboxes) to allow the user to select the variants of the portion of the content for which information is presented (e.g., displayed in a graph).

The reporting module 316 may collect information pertaining to accesses of the published content by end users as well as actions of the end users before, during, or after the accesses. From this information, the reporting module 316 may determine which portions of the portions of the content or its variants are most likely to increase revenues of a network-based publication system associated with the content. For example, the reporting module 315 may collect or derive information pertaining to fees that the network-based publication system collects from end users of the network-based publication system based on accessed by the end-users to various portions (or variants of the portions) of the published content.

Figure 6:
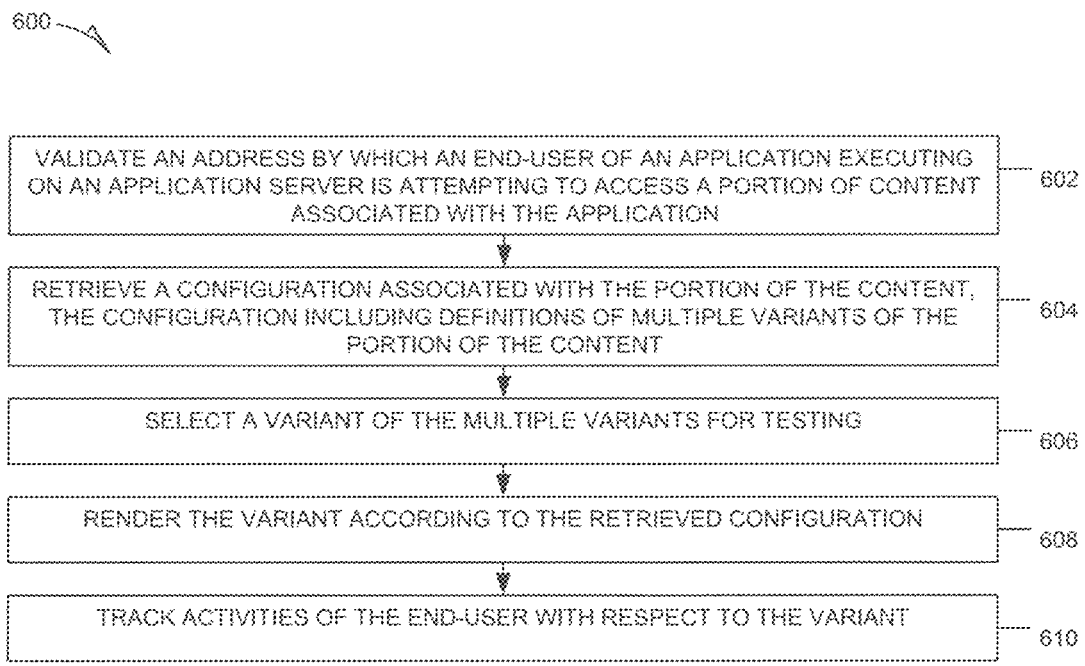
FIG. 6 is a flowchart illustrating an example method of managing access to application server content.

FIG. 6 is a flowchart illustrating an example method 600 of managing access to application server content. Various operations of the method 600 are performed by the run-time layers 122. At operation 602, the validating module validates an address (e.g., a URL) by which an end user (E.G., of a network-based publication system) is attempting to access a portion (e.g., a web page) of the content served by an application executing on an application server.

At operation 604, the retrieving module 404 retrieves a configuration associated with a latest published version of the portion of the content that is to be served to the user based on the address. The configuration may be retrieved from a database (e.g., database 126). The configuration may be a configuration stored in the database by the publishing module 310.

At operation 606, the testing module 408 selects a variant from one or more variants associated with the portion of the content for presentation to the end user.

At operation 608, the rendering module 406 renders the portion of the content based on the retrieved configuration. The rendering module 406 may interpret the configuration based on a detection of a device type, device characteristic, or particular device on which the content is to be rendered.

At operation 610, the tracking module 410 tracks the activities of end users of the application with respect to the one or more variants. The tracking module 410 may calculate one or more metrics pertaining to the one or more variants. Such metrics may include a VIP ratio. The tracking module 410 may store the tracking information in a database (e.g., the database 126). The tracking module 410 may use an identifier of the portion of the content (e.g., the identifier discussed above with respect to operation 520 of FIG. 5) to associate tracking information with the variants. The database may be accessible to the reporting module 316 for reporting on the tracking information.

Figure 7:
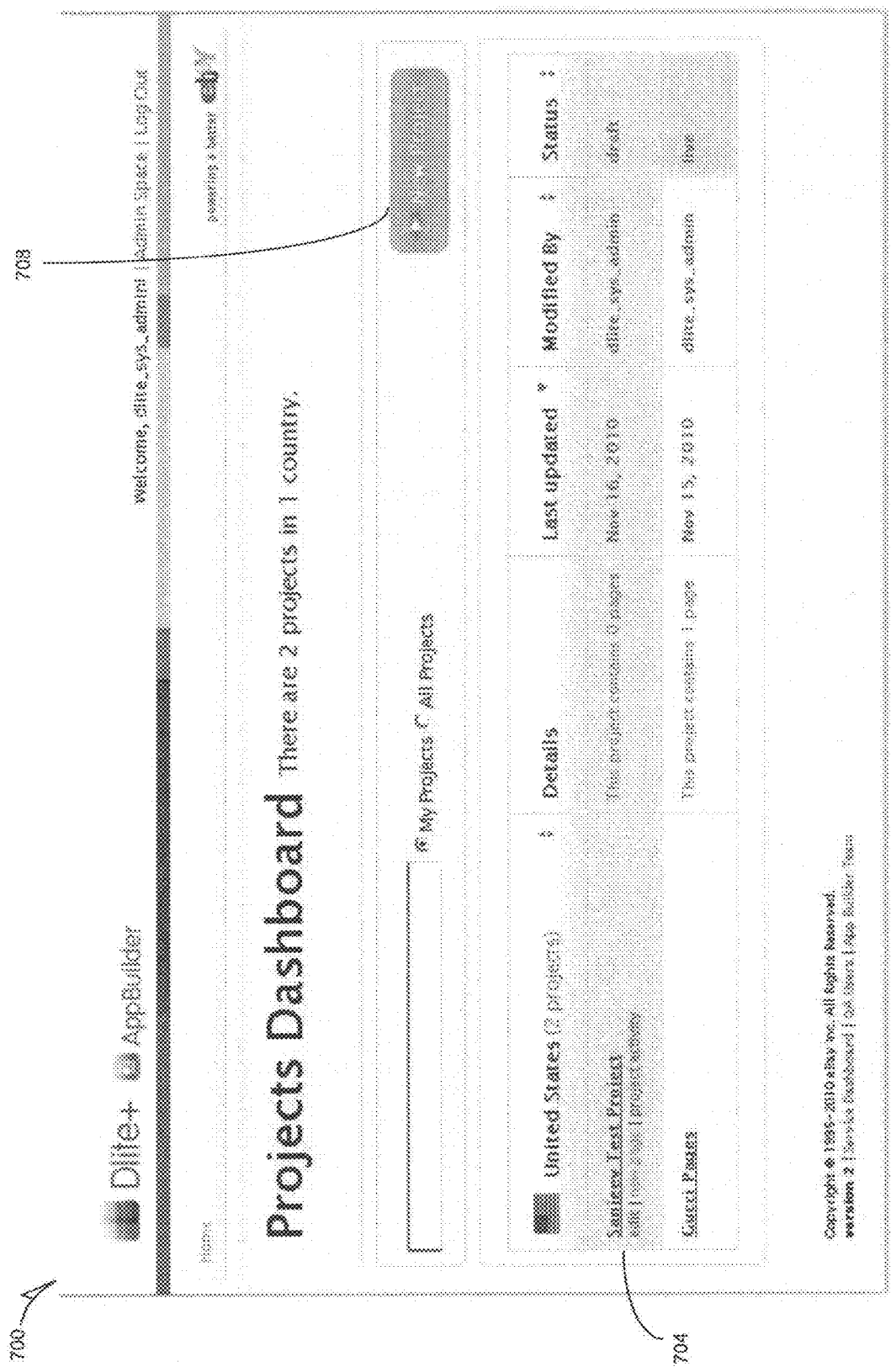
FIG. 7 is a screenshot of an example user interface for a projects dashboard.

FIG. 7 is a screenshot of an example user interface for a projects dashboard 700. The project module 302 may present the projects dashboard 700 to a user. The projects dashboard enables the user to manage projects associated with the content-optimization applications 234. The projects dashboard 700 may present information about one or more projects in one or more project entries (e.g., project entry 704). Each project entry may include information about a project, such as the name of the project, details about the project (e.g., the number of pages in the project), the date at which the project was last updated, the name of the user that last modified the project, and a status of the project. For example, the status of the project may specify that the project is a draft project (e.g., that the project has not been published) or a live project (e.g., that the project has been published).

Each project entry may also include links to additional user interface for editing, creating new content for, or viewing project activity related to a project. Project entries may be organized by countries for which they are designed (e.g., the United States, France, and so on). The title area of the projects dashboard 700 may include a summary of information pertaining to the projects (e.g., the number of projects and the number of countries to which the projects apply). Additionally, headers under which project entries are organized (e.g., country headers) may include a summary of information pertaining to projects included within the header (e.g., the number of projects associated with a particular country). When a user interacts with (e.g., click) a column header (e.g., a "Last updated," "Modified By," or "Status" header) the projects dashboard 700 may cause project entries to be sorted by the information contained in the column (e.g., update date, user name of modifier, or status, respectively).

The projects dashboard 700 may include a search box into which a user may enter a query to search for a project. Additionally, the projects dashboard 700 may include a filtering mechanism (e.g., a "My Projects" radio button or an "All projects" radio button) to enable the user to filter the project entries. The projects dashboard 700 may also include a user interface element 708 (e.g., a "New Project" button). By interacting with the user interface element 708, a user may create a new project, adding a corresponding project entry to the project dashboard 700.

FIG. 8 is a screenshot of an example user interface for a new project wizard 800. The project module 302 may present the new projects wizard 800 to a user of the content-optimization applications 234. The new project wizard 800 enables the project module 302 to collect information about a new project. The new project wizard 800 may divide the collection process into multiple selectable steps. For example, the new project wizard 800 may include separate steps for collecting general information about the new project, a selection of countries to which the project applies, and a project team to associate with the project.

The new project wizard 800 may present one or more project types for selection by the user. Examples of project types may include a daily deal page, a prototype page, or a brand landing page. In response to a selection of a project type, the new project wizard 800 may display information about the project type, such as a description of the project type, a number of layouts supported by the project type, and a number of widgets supported by the project type.

The new project wizard 800 may include user interface elements (e.g., a drop down boxes) for collecting information from the user pertaining to an address (e.g., a URL) to assign to the project. The new project wizard 800 may provide a default value for the address that is based on a selection of a project type. For example, if the user selects a project type corresponding to a brand landing page, the new project wizard 800 may specify a default URL for the project of http://pagename.brands.entity.com/path, where pagename is the name of a page of content associated with the project, path is a path to the page, and entity is the name of an entity (e.g., eBay) providing content associated with the project to end users of an application. Additionally, the new project wizard 800 may provide variations of the address for selection by the user. The user may select one of the suggested addresses or specify a different address.

The new project wizard 800 may include user interface elements (e.g., text boxes) for collecting additional information about the project from the user, such as a name of the project and a description of the project.

Figure 9:
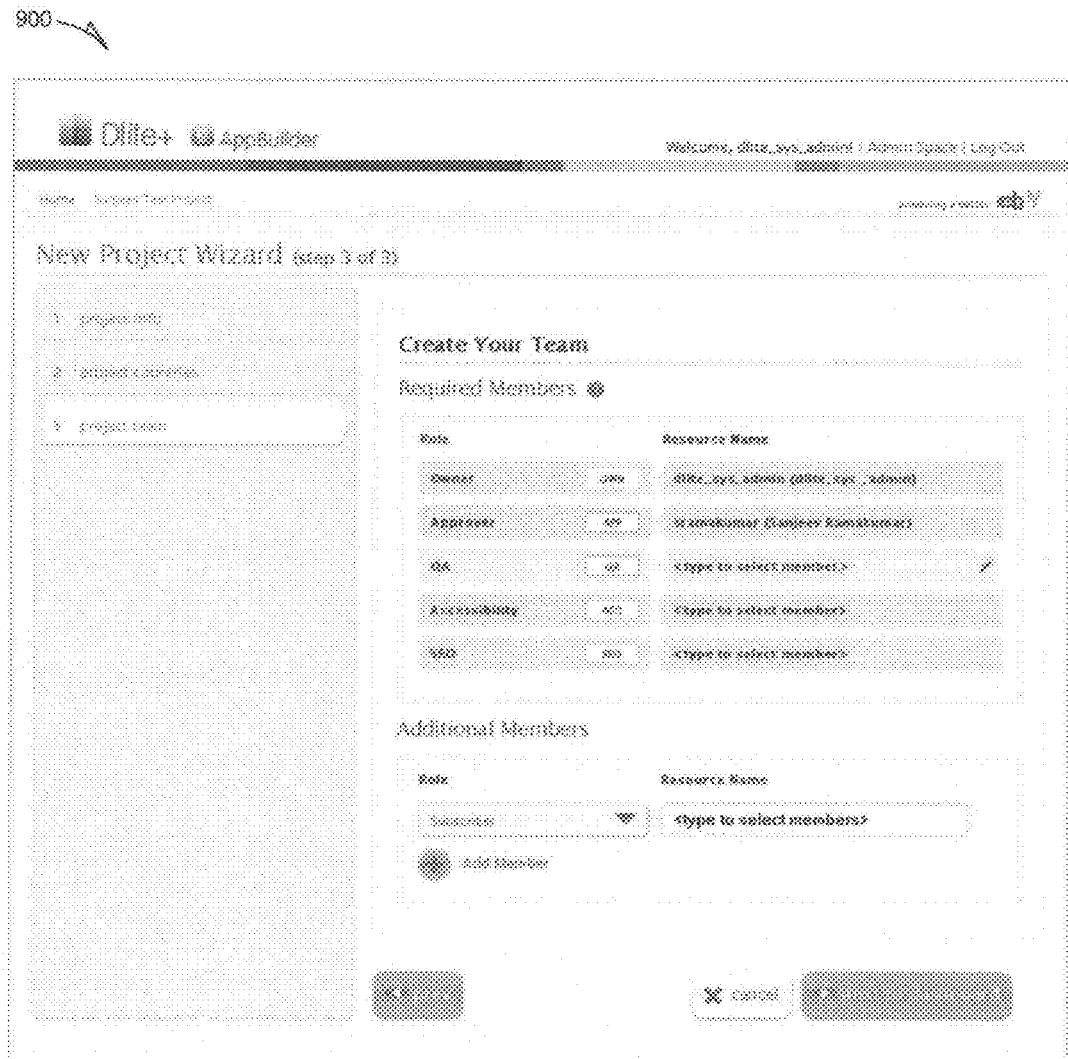

FIG. 9 is a screenshot of an example user interface for a new project wizard 900. The project module 302 may present the new projects wizard 800 to a user. The new project wizard 900 enables the project module 302 to collect information about a new project. The new project wizard 900 includes user interface elements for specifying team members to associate with the project. Each team member may have a role and a resource name. Some team members may be "required" team members. A required team member may be a team member having a role that an administrator of the project has specified is required for projects of a particular type. For example, an administrator may specify that projects of the brand landing page type must have team members having roles of owner, approver, QA, accessibility, and SEO.

For each of the required team members, a user of the content-optimization applications 234 may be required to specify a resource name before submitting portions of content associated with the project for approval by the team members. The new project wizard 900 may include a user interface element (e.g., a text box) that the user can select to specify a resource name to associate with a role. For example, to specify a resource name for a required team member having a resource role of "QA," the user may select a highlighted region (or icon) and type the name of the resource. Alternatively, upon selecting the user interface element, the new project wizard 900 may present a list of resource names having the required role. The user may then select a resource name from the list to associate it with the required role.

The new project wizard 900 may include user interface elements for specifying optional team members. For example, the new project wizard 900 may present a drop-down box from which the user can select a role of a new team members and a text box for specifying a resource name of the team member. The new project wizard 900 may also include a user interface element (e.g., a button) by which the user may submit the new team member for association with the project as an optional team member. The new project wizard may also include a user interface element (e.g., a button) that the user can select to proceed to a page dashboard for managing pages associated with the selected project.

Figure 10:
FIG. 10 is a screenshot of an example user interface for a page dashboard.

FIG. 10 is a screenshot of an example user interface for a page dashboard 1000. The page module 304 may present the page dashboard 1000 to the user. The page dashboard 1000 enables a user to manage portions of content (e.g., web pages) associated with a project. The page dashboard 1000 may include thumbnail images of each portion of content associated with the project (e.g., in a scrollable region of the page dashboard 1000). The page dashboard 1000 may include information about the project, including its name, date of creation, resources (e.g., team members), or description. The page dashboard 1000 may include one or more page entries.

Each page entry may include information about each page associated with the project, including its name, address (e.g., URL), number of variants being tests, date of last update, name of a resource performing the most recent modification, and a status. For example, the status may specify "incomplete team" if the user has not yet specified resource names for all of the required team members of the project. When a user selects a page entry (e.g., the name of the page), the page dashboard 1000 may present the user with an additional user interface for editing the page (see, e.g., the page editor 1300 of FIG. 13). The page dashboard 1000 may also include a search box in which a user may enter a query to search for a particular page included in the project.

The page dashboard 1000 may include a user interface element (e.g., a button) that enables the user to view or modify a configuration of the current project. For example, when the user clicks on the project configuration button, the page dashboard 1000 may present the user with a user interface similar to the new project wizard 800 of FIG. 8 to enable the user to provide new information about the project. The page dashboard 1000 may include a user interface element (e.g., a button) for creating a new page to associate with the project. When a user selects the user interface element to create a new page, the page dashboard 1000 may present the user with the new page wizard 1100 of FIG. 11.

Figure 11:
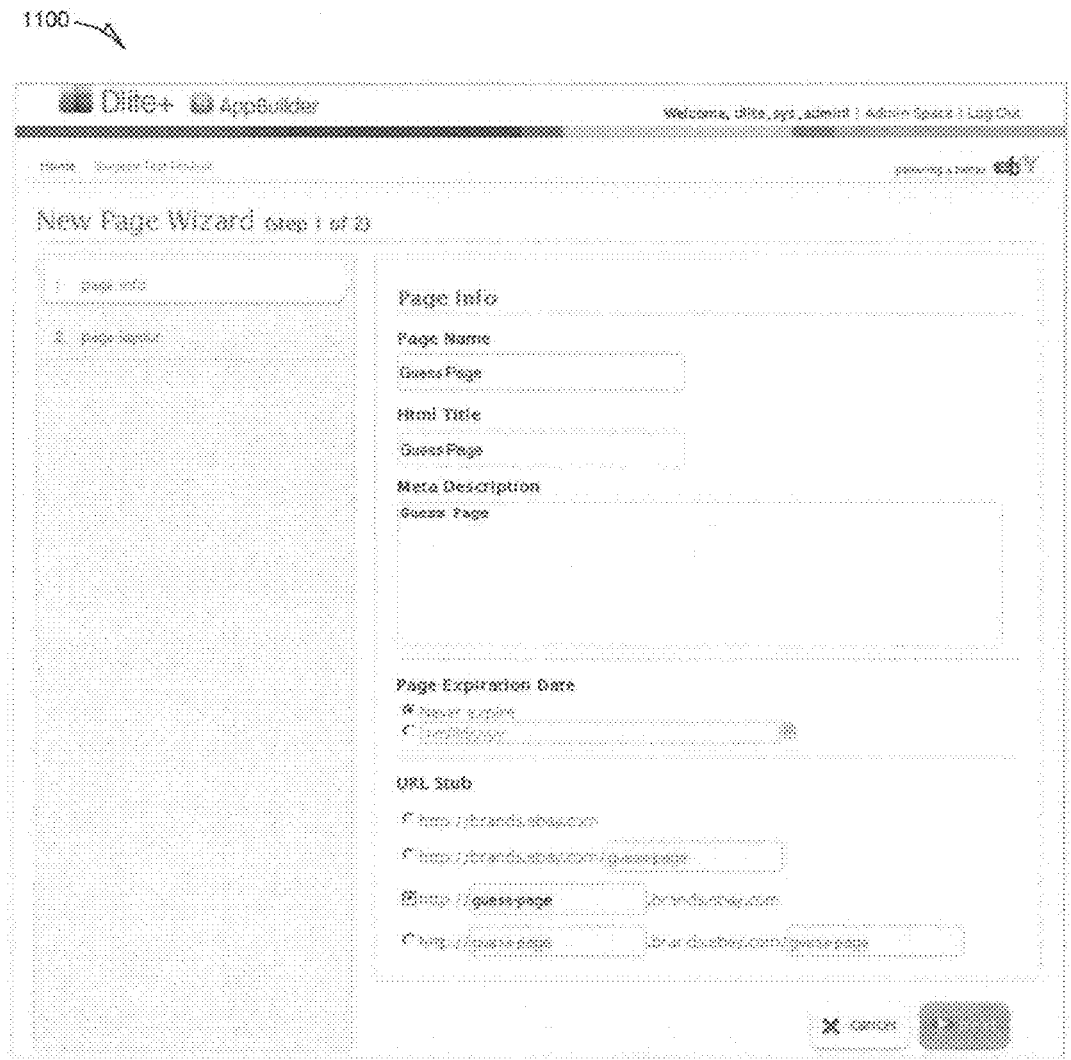
FIG. 11 is an example user interface for a new page wizard 1100. The page module 304 may present the new page wizard 1100 to the user.

FIG. 11 is an example user interface for a new page wizard 1100. The page module 304 may present the new page wizard 1100 to the user. The new page wizard 1100 enables the page module 304 to collect information about a portion of content (e.g., a web page) associated with the project. The new page wizard 1100 may divide the information-collection process into multiple steps. For example, the new page wizard 1100 may collect general information about a page in a first step and information about a layout to associate with the page in a second step.

The page wizard 1100 may include user interface elements (e.g., text boxes) to enable the user to specify a name of the page, a title (e.g., an HTML title) of the page, or a meta description of the page. The page wizard 1100 may include user interface elements (e.g., radio buttons) to enable the user to specify whether the page has an expiration date and, if so, the page wizard 1100 may include a text box or a calendar control to enable the user to specify the expiration date.

The page wizard 1100 may provide selectable addresses (e.g., URL stubs) that may be associated with the portion of the content. Each of the selectable addresses may include a fixed portion and an editable portion. The page wizard 1100 may provide a default value for the fixed portion that is based on the project type. The page wizard 1100 may include a default value for the editable portion that is based on information about the page (e.g., the page name or title). For example, the page wizard 1100 may include multiple URL stubs having a fixed portion including the text "brand" if the project type is brand-related and an editable portion that is based on the title of the page. The user may then select one of the addresses to associate with the current portion of the content.

Figure 12:
FIG. 12 is a screenshot of an example user interface for a new page wizard.

FIG. 12 is a screenshot of an example user interface for a new page wizard 1200. The page module 304 may present the new page wizard 1200 to the user. The new page wizard 1200 enables the page module 304 to associate a page layout with the current portion of the content. In various embodiments, the new page wizard 1200 presents thumbnail images of page layouts supported by the project in a scrollable region for selection by the user. For example, the user may select a thumbnail of a "Brand Landing Pages" page layout to associate the page layout with the current portion of the content.

Figure 13:
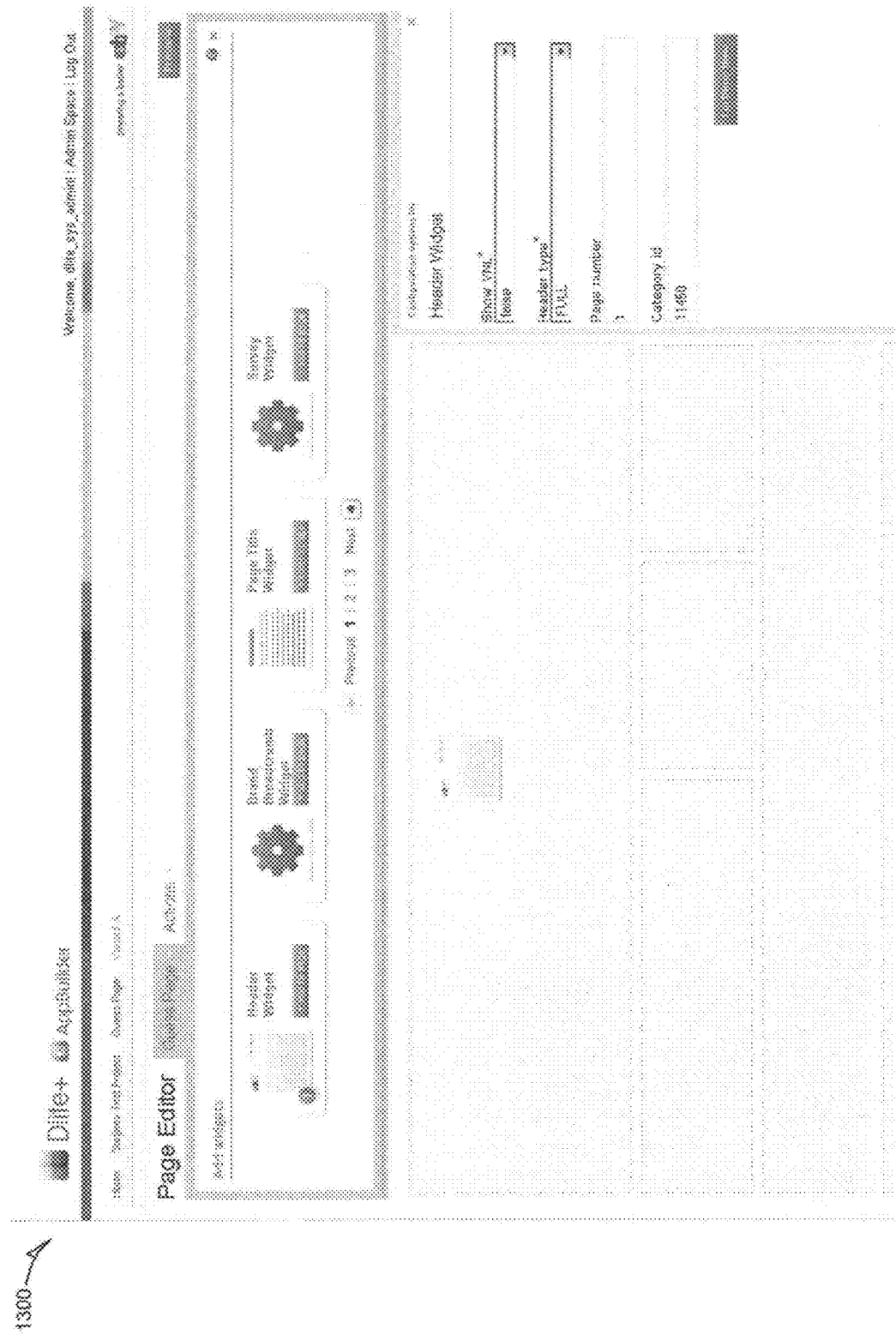
FIG. 13 is a screenshot of an example user interface for a page editor.

FIG. 13 is a screenshot of an example user interface for a page editor 1300. The editing module 306 may present the page editor 1300 to the user. The page editor enables the editing module 306 to collect a definition of the content from the user. For example, the page editor 1300 may present a visual representation of the page layout associated with the current portion of the content. Additionally, the page editor 1300 may present a visual representation of widgets that the user may include in the current portion. The page editor 1300 may enable the user to drag and drop the visual representations of the widget onto regions of the page layout to associate an instance of the widget with the region. For example, the page editor 1300 may enable the user to drag and drop a header widget into a top region of the page layout to associate the instance of the widget with that region of the portion of the content.

The page editor 1300 may provide user interface elements (e.g., text boxes and drop-down boxes in a configurations options view) to collect information from the user pertaining to configuration options of an instance of a widget. For example, the user may select an instance of a widget that the user has included on a region of the page layout and then specify configuration options for the widget, such as whether the widget displays a particular aspect or is of a particular type. The page editor 1300 may provide a user interface element to enable the user to preview the portion of the content as it would appear upon publication to end users of an application. When the user selects the preview user interface element, the page editor 1300 may display the preview (see, e.g., preview 1400 of FIG. 14).

The page editor 1300 may include user interface elements that enable a user to create a new variant of the portion of the content or clone the portion. For example, the editing module 306 may present an "Actions" menu that includes menu items (not shown) for creating a new variant of the current portion or creating a clone of the current portion.

Figure 14:
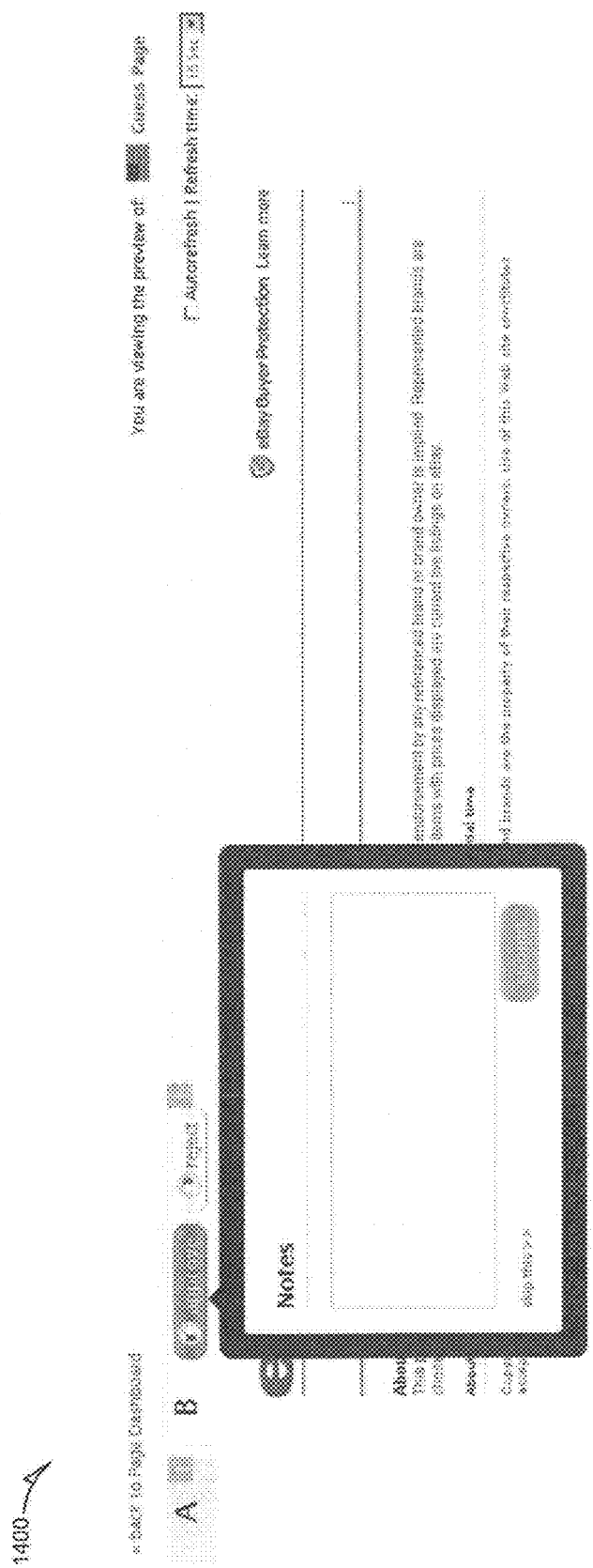
FIG. 14 is a screenshot of an example user interface for the preview.

FIG. 14 is a screenshot of an example user interface for the preview 1400. The preview 1400 may be presented by the previewing module 308. The preview 1400 presents the portion of the content as it would be presented to the end user of an application upon publication of the portion. For example, the preview 1400 may present the portion of the content as it would to an end user accessing the content using a particular combination of supported hardware (e.g., a personal computer or a handheld device) and software (e.g., a particular client application).

The preview 1400 may include user interface elements (e.g., tabs) that enable the user to toggle between variants of the portion of the content for previewing. For example, the preview 1400 may include an "A" tab that the user may select to view the "A" variant of the portion of the content and a "B" tab that the user may select to view the "B" variant of the portion. The previous 1400 may present user interface elements corresponding to different options based on the user to which the preview is presented. For example, if the user is a developer of the portion of the content, the preview 1400 may include an icon in the user interface element for toggling between the variants of the portion that indicates whether the variant has been approved of or rejected by team members associated with the project.

If the user is a team member associated with the project whose approval is required or optional, the preview 1400 (e.g., in conjunction with the approval module 310) may include user interface elements (e.g., buttons) to enable the user to express an approval or rejection of the portion of the content. Additionally, the preview 1400 may include a user interface element (e.g., a dialog box that includes a text box) for providing reasons in support of an approval or rejection of the portion. Additionally, the preview 1400 may include a user interface (e.g., a checkbox) element to enable the user to specify whether the preview is refreshed automatically to get the latest updates to the portion and its variants. The preview 1400 may also include a user interface element (e.g., a drop-down box) to enable the user how often the preview is refreshed to get the latest updates to the portion.

Figure 15:
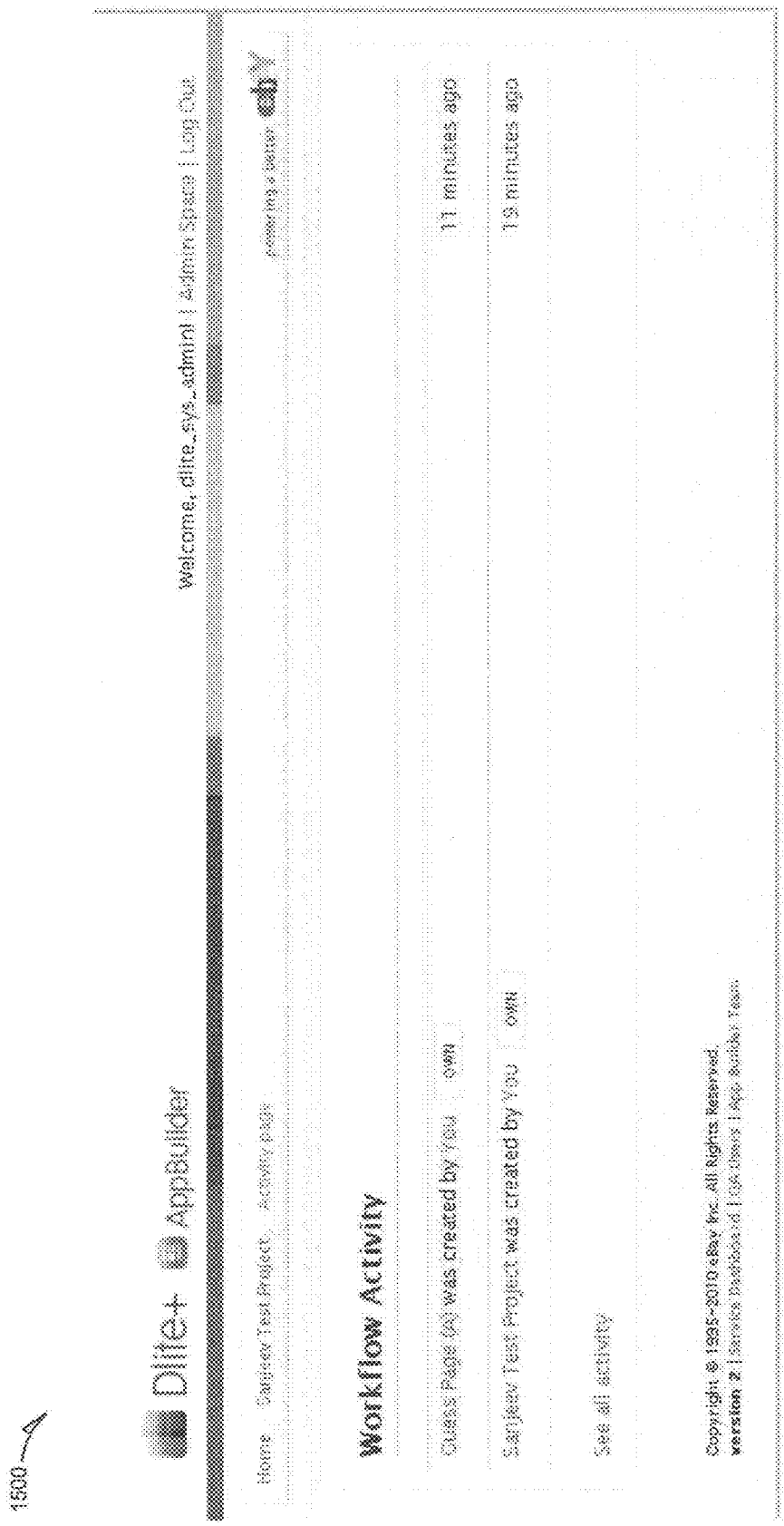
FIG. 15 is screenshot of an example user interface for a workflow activity view.

FIG. 15 is screenshot of an example user interface for a workflow activity view 1500. The activity module 318 may present the workflow activity view 1500. The workflow activity view 1500 lists information about activities pertaining to a project. The information may be presented as a list of one or more activity items. Each activity item may include information corresponding to one or more columns, such as a name of a project or project component (e.g., a web page) that is the subject of the activity, the activity that was performed, a user name of the user who performed that activity, a role of the user who performed the activity, or information about how recently the activity was performed. Each element of the information pertaining to each activity item may serve as a link to an additional user interface associated with the element. For example, if a page of content is a subject of an activity, the name of the page may link to an additional user interface for editing the page (e.g., the page editor 1300 of FIG. 13).

Figure 16:
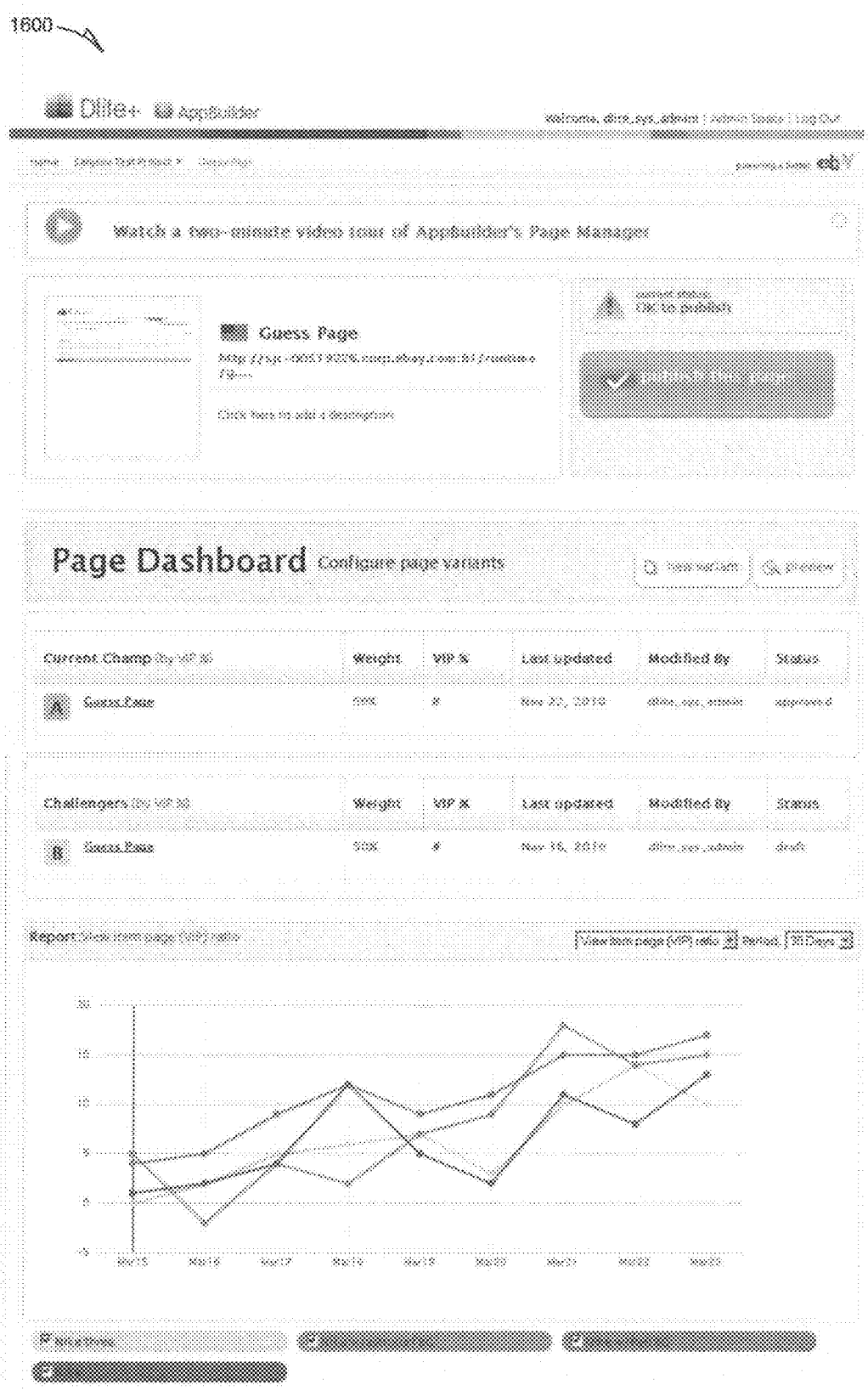
FIG. 16 is a screenshot of an example user interface for a page variant dashboard.

FIG. 16 is a screenshot of an example user interface for a page variant dashboard 1600. The reporting module 316 may present the page variant dashboard 1600. The page variant dashboard 1600 may enable a user to publish a portion of content (e.g., a web page) or a variant of the portion of content. For example, the page variant dashboard 1600 may include a button (e.g., "publish this page") that the user can select to publish the portion or variant. The page variant dashboard 1600 may provide information about portions of content (e.g., web pages) associated with the current project. For example, the page variant dashboard 1600 may show which variant of a portion of content has been the most successful with respect to a performance metric, such as a view item page (VIP) ratio. The page variant dashboard 1600 may display the information about the portions of the content as a listing of page variant items.

Each of the page variant items may include various columns of information, including an identifier of the variant (e.g., "A" or "B"), the name of the variant, a weight of the variant (e.g., the percentage of times the variant is used as a test case for presentation to an end user of the corresponding application) a value of a performance metric associated with the variant (e.g., a VIP ratio), the date the page was last updated, the name of a user that last updated the page, and a statue of the page (e.g., draft, pending approval, approved, published, and so on).

In various embodiments, the page variant dashboard 1600 may present the mechanism for publishing the content only if the necessary team members have approved of the content. If a portion or variant has not be submitted to team members associated with the project for their approval, the page variant dashboard 1600 may provide a mechanism (e.g., a "submit for approval" button, not shown) to enable a developer of the portion or variant to submit a portion of content or a variant of the portion of the content for approval by team members associated with the project.

The page variant dashboard 1600 may present various values included in each page variant item as editable values. For example, a user may be able to use the variant dashboard 1600 to modify the weight associated with a variant, causing the variant to be used more or less often as a test case in presentations of the portion of the content to end-users of a corresponding application.

The page variant dashboard 1600 may present a thumbnail image of a variant based on a selection of the variant by the user. Additionally, the page variant dashboard 1600 may include a mechanism (e.g., a "new variant" button) for adding a new variant of a portion of content or a mechanism (e.g., a "preview" button) for previewing the variant or the portion.

The page variant dashboard 1600 may include a report view for displaying information pertaining to a performance metric (e.g., a VIP ratio) associated with one or more variants. The reporting module 316 may provide the information. The report view may present the information in graph form. The report view may include a mechanism to enable a user to select a particular performance metric to view or a mechanism to enable the user to select a time period over which to view a performance metric. The report view may also include a mechanism to select one or more variants to view with respect to the metric. For example, if a page has three four variants, the report view may list the names of the four variants next to selectable check boxes. By selecting a check box, the user may add the corresponding variant on a graph. By deselecting a check box, the user may remove the corresponding variant from the graph.

Figure 17:
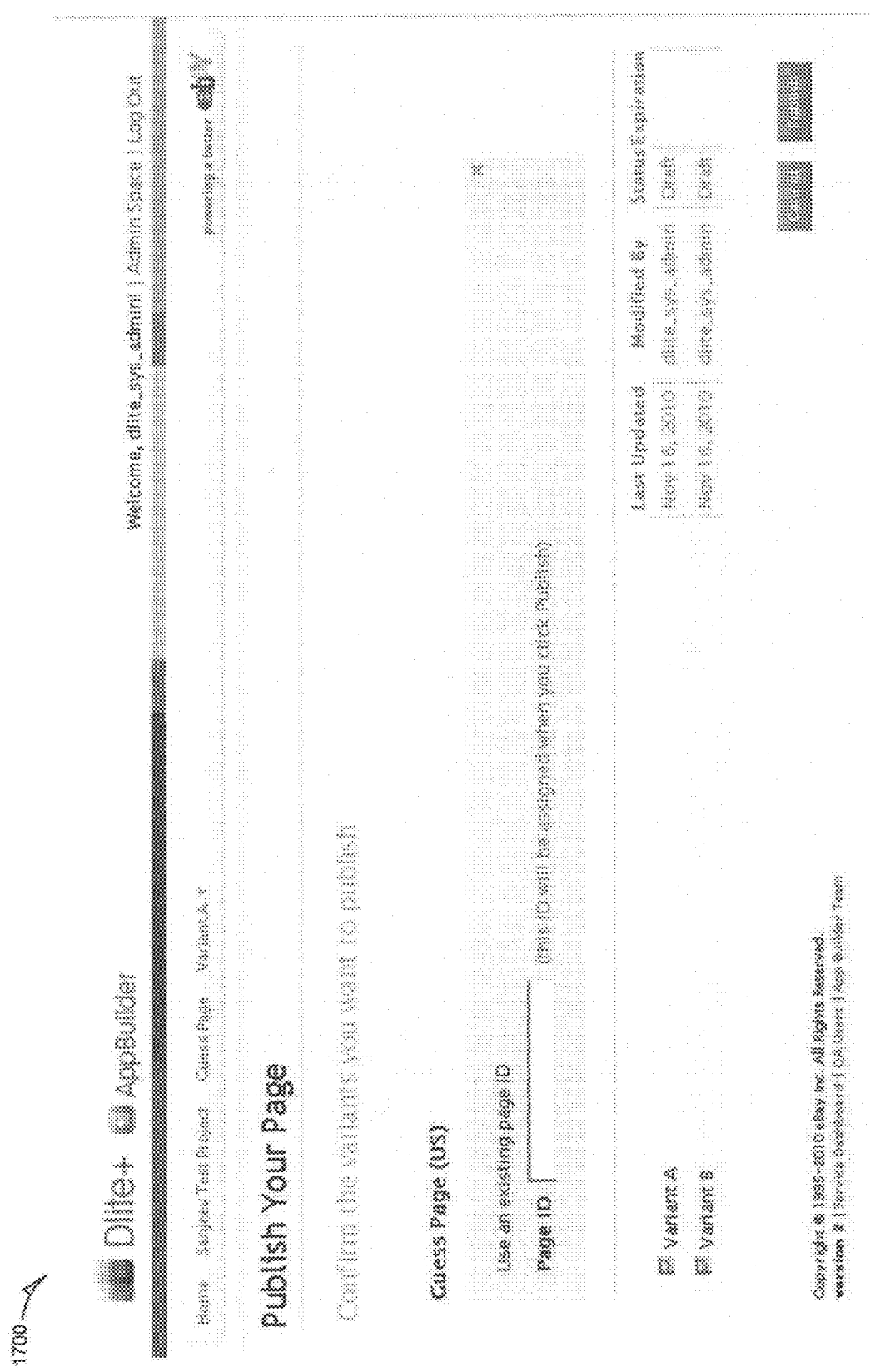
FIG. 17 is a screenshot of an example user interface for a content publisher.

FIG. 17 is a screenshot of an example user interface for a content publisher 1700. The publishing module 314 may present the publisher 1700 (e.g., based on a selection by the user of a "publish this page" button on the page variant dashboard 1600 of FIG. 16). The publisher 1700 may include a mechanism (e.g., a text box) into which the user may enter an identifier to associate with the portion of content to be published. Additionally, the publisher 1700 may enable the user to select a particular variant from a list of variants of the portion for publication. The publisher 1700 may also present information pertaining to each variant, such as when the variant was last updated, who performed the last update, the status of the variant, and date at which the variant is scheduled to expire. When a variant is published, the variant may be presented to an end-user when the end-user accesses the corresponding portion of the content.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 120) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 18:
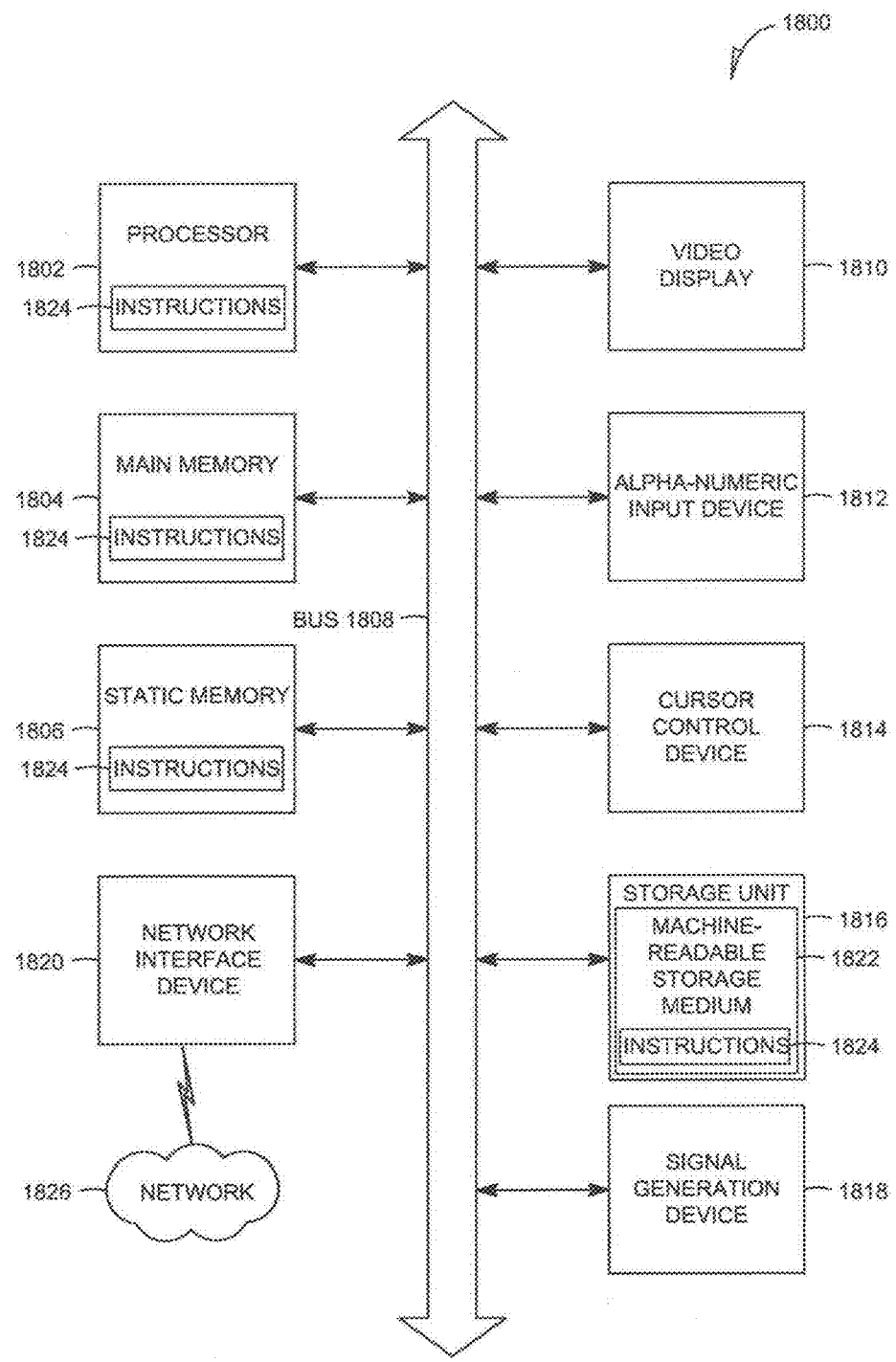
FIG. 18 is a block diagram of machine in the example form of a computer system within which instructions for causing the machine to perform any one or more of the methodologies discussed herein may be executed.

FIG. 18 is a block diagram of machine in the example form of a computer system 1800 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1800 includes a processor 1802 (e.g., a central processing unit (CPU), a graphics processing unit (GPU) or both), a main memory 1804 and a static memory 1806, which communicate with each other via a bus 1808. The computer system 1800 may further include a video display unit 1810 (e.g., a liquid crystal display (LCD) or a cathode ray tube (CRT)). The computer system 1800 also includes an alphanumeric input device 1812 (e.g., a keyboard), a user interface (UI) navigation (or cursor control) device 1814 (e.g., a mouse), a disk drive unit 1816, a signal generation device 1818 (e.g., a speaker) and a network interface device 1820.

The disk drive unit 1816 includes a machine-readable medium 1822 on which is stored one or more sets of instructions and data structures (e.g., software) 1824 embodying or utilized by any one or more of the methodologies or functions described herein. The instructions 1824 may also reside, completely or at least partially, within the main memory 1804 and/or within the processor 1802 during execution thereof by the computer system 1800, the main memory 1804 and the processor 1802 also constituting machine-readable media. The instructions 1824 may also reside, completely or at least partially, within the static memory 1806.

While the machine-readable medium 1822 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

The instructions 1824 may further be transmitted or received over a communications network 1826 using a transmission medium. The instructions 1824 may be transmitted using the network interface device 1820 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding or carrying instructions for execution by the machine, and includes digital or analog communications signals or other intangible media to facilitate communication of such software. The network 1826 may be one of the networks 120.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
    receiving a request to publish a second variant of a content page, the second variant of the content page including a variation from a first variant of the content page, the variation conforming to a template associated with the content page, the request being submitted by a first entity associated with a project for managing the content page, the first entity being associated with a role that is authorized to submit the request, the content page configured to be served by an application executing on an application server;
    based on a receiving of an approval from a second entity associated with the project for managing the content page, the second entity being associated with a role that is authorized to approve the request, publishing the second variant of the content page;
    assigning a weight to the second variant, the weight corresponding to a probability that the second variant will be presented instead of the first variant upon a requisition to access the content page;
    selecting a variant from among the first variant and the second variant of the content page for presentation based on the probability; and
    generating a comparison of a performance of the first variant of the content page to a performance of the second variant of the content page for use in modifying the weight, wherein the generating of the comparison is performed by a computer processor.

2. The method of claim 1, wherein the comparison of the performance of the first variant of the content page to the performance of the second variant of the content page is based on a view item page ratio calculated for the first variant and a view item page ratio calculated for the second variant.

3. The method of claim 1, wherein the view item page ratio of the first variant represents a ratio of a number of users of a network-based publication system who accessed the first variant to a number of the users who bid on an item listed on the network-based publication system after accessing the first variant.

4. The method of claim 1, wherein the first entity is a first member of a team responsible for managing the content page and the second entity is a second member of the team responsible for managing the content page.

5. The method of claim 4, wherein the second entity is selected based on the second entity being designated as a member of the team whose approval is required for publication of the content page.

6. The method of claim 4, wherein the second entity is selected based on the second entity being assigned a role corresponding to a quality assurance role.

7. The method of claim 1, wherein the template is designed to provide a consistent user interface across multiple content pages featuring related items listed on a network-based publication system.

8. A system comprising:
    one or more processors coupled to a memory the memory including instructions configuring one or more processors to, at least;
    receive a request to publish a second variant of a content page, the second variant of the content page including a variation from a first variant of the content page, the variant conforming to a template associated with the content page, the request being submitted by a first entity associated with a project for managing the content page, the first entity being associated with a role that is authorized to submit the request, the content page configured to be served by an application executing on an application server;
    based on a receiving of an approval from a second entity associated with the project for managing the content page, the second entity being associated with a role that is authorized to approve the request, publish the second variant of the content page;
    assign a weight to the second variant the weight corresponding to a probability that the second variant will be presented instead of the first variant upon a requisition to access the content page;
    select a variant from among the first variant and the second variant of the content page for presentation based on the probability; and generate a comparison of a performance of the first variant of the content page to a performance of the second variant of the content page for use in modifying the weight.

9. The system of claim 8, wherein the comparison of the performance of the first variant of the content page to the performance of the second variant of the content page is based on a view item page ratio calculated for the first variant and a view item page ratio calculated for the second variant.

10. The system of claim 8, wherein the view item page ratio of the first variant represents a ratio of a number of users of a network-based publication system who accessed the first variant to a number of the users who bid on an item listed on the network-based publication system after accessing the first variant.

11. The system of claim 8, wherein the first entity is a first member of a team responsible for managing the content page and the second entity is a second member of the team responsible for managing the content page.

12. The system of claim 11, wherein the second entity is selected based on the second entity being designated as a member of the team whose approval is required for publication of the content page.

13. The system of claim 11, wherein the second entity is selected based on the second entity being assigned a role corresponding to a quality assurance role.

14. The system of claim 8, wherein the template is designed to provide a consistent user interface across multiple content pages featuring related items listed on a network-based publication system.

15. A non-transitory computer-readable medium comprising a set of instructions that, when executed by at least one processor of a computer system, cause the computer system to perform operations, the operations comprising:
receiving a request to publish a second variant of a content page, the second variant of the content page including a variation from a first variant of the content page, the variation conforming to a template associated with the content page, the request being submitted by a first entity associated with a project for managing the content page, the first entity being associated with a role that is authorized to submit the request, the content page configured to be served by an application executing on an application server;
based on a receiving of an approval from a second entity associated with the project for managing the content page, the second entity being associated with a role that is authorized to approve the request, publishing the second variant of the content page;
assigning a weight to the second variant, the weight corresponding to a probability that the second variant will be presented instead of the first variant upon requisition to access the content page;
selecting one of the first variant and the second variant of the content page for presentation based on the probability; and
generating a comparison of a performance of the first variant of the content page to a performance of the second variant of the content page for use in modifying the weight.

16. The non-transitory computer-readable medium of claim 15, wherein the comparison of the performance of the first variant of the content page to the performance of the second variant of the content page is based on a view item page ratio calculated for the first variant and a view item page ratio calculated for the second variant.

17. The non-transitory computer-readable medium of claim 15, wherein the view item page ratio of the first variant represents a ratio of a number of users of a network-based publication system who accessed the first variant to a number of the users who bid on an item listed on the network-based publication system after accessing the first variant.

18. The non-transitory computer-readable medium. of claim 15, wherein the first entity is a first member of a team responsible for managing the content page and the second entity is a second member of the team responsible for managing the content page.

19. The non-transitory computer-readable medium of claim 18, wherein the second entity is selected based on the second entity being designated as a member of the team whose approval is required for publication of the content page.

20. The non-transitory computer-readable medium of claim 18, wherein the second entity is selected based on the second entity being assigned a role corresponding to a quality assurance role.

* * * * *